UNITED STATES PATENT OFFICE.

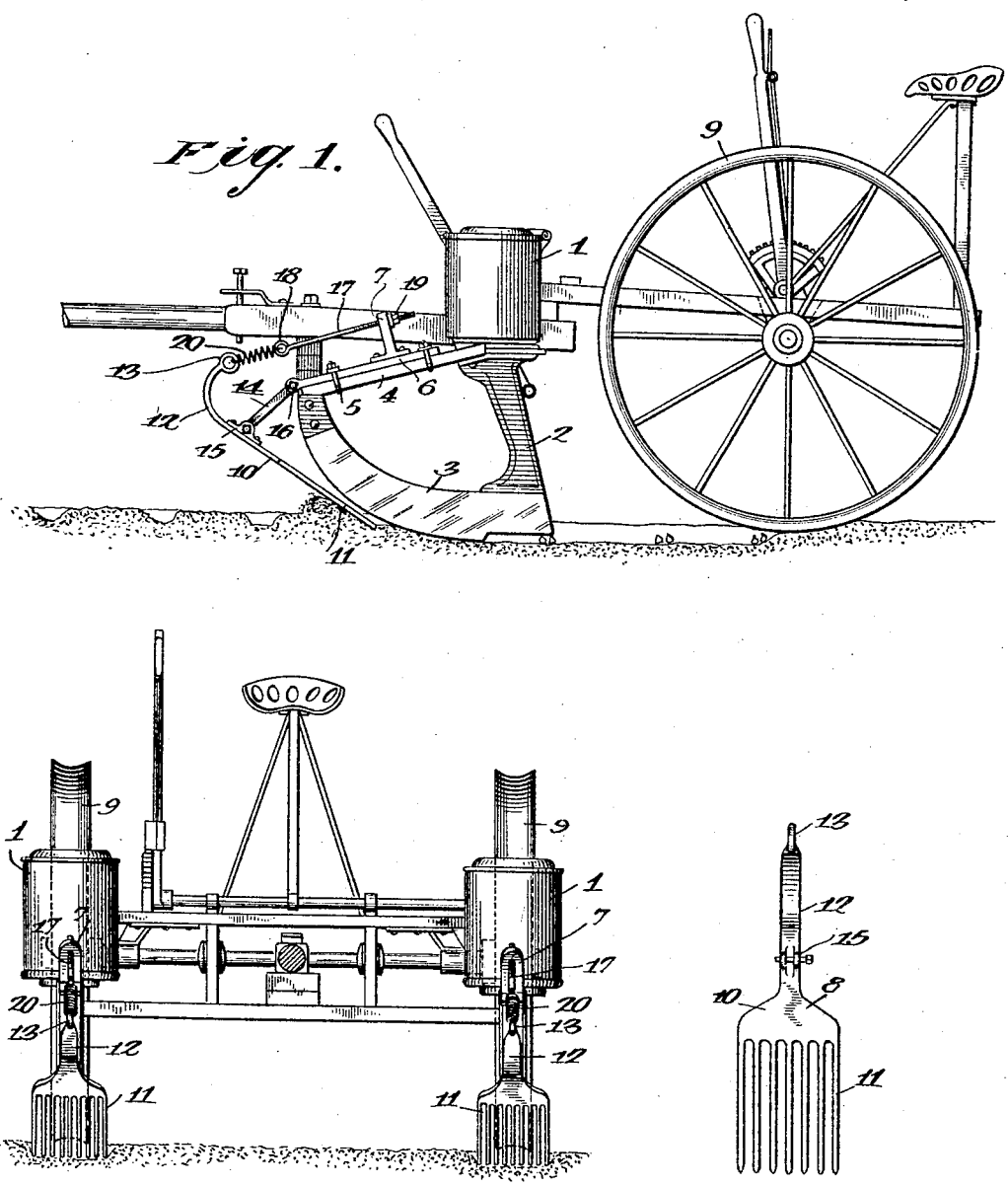

FRED IRENUS CLASSON, OF OTTAWA, ILLINOIS.

PLANTER ATTACHMENT.

1,324,728.  Specification of Letters Patent.  Patented Dec. 9, 1919.

Application filed May 6, 1919. Serial No. 295,194.

*To all whom it may concern:*

Be it known that I, FRED I. CLASSON, a citizen of the United States, and a resident of Ottawa, in the county of La Salle and State of Illinois, have invented certain new and useful Improvements in Planter Attachments, of which the following is a specification.

This invention relates to an improvement in planter attachments and one of the principal objects thereof is to provide a means for evening and smoothing irregularities in the surface of the ground due to the tracks made by the horses or to uneven harrowing and thereby allowing the drill to deposit the seed at a uniform depth beneath the surface.

A further object of the invention is to provide an improved attachment which will be characterized by advantages of simplicity, durability, efficiency in operation, and economy in manufacture and maintenance.

With these and other objects in view, which will become apparent as the description proceeds, the invention resides in the construction combination and arrangement of parts hereinafter more fully described and claimed and illustrated in the accompanying drawing in which like characters of reference indicate like parts throughout the several figures, of which—

Figure 1 represents a side elevational view of a corn planter equipped with the invention;

Fig. 2 represents a front elevational view thereof; and

Fig. 3 represents a rear elevational view of one of the rakes removed.

In the drawing I have shown the invention, for convenience of illustration, as applied to a two-horse double-row planter. It will be understood, however, that the invention is equally applicable to planters and drills of other and various types.

Referring more particularly to the drawing, the planter includes the hoppers 1, from which the grain is fed through the boots 2. The furrow openers are indicated at 3, and braces supporting the forward ends of the openers to the main frame of the planter are indicated at 4.

On each of the braces 4 is mounted by bolts or other suitable means 5, a base plate 6, having an upwardly extending bracket 7.

A rake or evener 8, of a width greater than the width of the tread of the covering wheels 9 is arranged in front of each opener 3. The rake includes the body portion 10 from which depend the tines or fingers 11. A shank 12 extends upwardly from the body of the rake and has an eye 13 formed at its upper rearwardly curved end.

The rake is connected to the base plate 6 by means of a link 14, which is pivoted at its forward end to the shank 12 adjacent the body of the rake between the rearwardly extending ears 15 carried by the shank. At its rear end the link is pivotally connected at 16 to the forward end of the base plate.

An adjusting bolt 17 having an eye 18 at its forward end is extended through the bracket 7, and a nut or washer indicated at 19 is threaded on the bolt against the rear face of the bracket. A coiled spring 20 connects the eye 13 of the rake with the eye 18 of the bolt. The tension of this spring is adjustable by adjusting the bolt 17 through the bracket 7.

In operation the teeth of the rake riding along the ground in advance of the opener evens out any irregularities in the surface of the ground, filling the tracks of the horses' feet and providing a relatively smooth path for the opener to follow. Hence there will be no tendency for the opener to ride up and down, and, as a consequence, the seed will be deposited at a relatively uniform depth beneath the surface. The spring will maintain the teeth of the rake properly positioned in advance of the opener and, at the same time, will allow the rake to give sufficiently in passing over obstructions such as stones and the like. The rake is of a width greater than the width of the opener or covering wheel so that a relatively wide smooth path for the opener or covering wheel to follow is provided. There will thus be no danger of the covering wheel failing to accomplish its purpose by riding up over obstructions or irregularities on the ground.

Although I have described the preferred embodiment of my invention, I may desire to make such changes in the construction, combination and arrangement of parts thereof as do not depart from the spirit of the invention and the scope of the appended claims.

I claim:

1. The combination with a planter having a rearwardly curved furrow opener, of a base plate mounted on the frame thereof, a rake arranged in advance of the opener of the planter and sloping rearwardly below the curve of said furrow opener and having ground-engaging teeth, a link pivotally connected at one end to the rake intermediate the ends of the latter and at its other end to the said base plate, a bracket carried by the base plate, an eye bolt adjustably mounted in the bracket, and a spring connecting at one end to the eyebolt and at its opposite end to the rake at a point above the point at which the said link is connected to the rake.

2. The combination with a planter having a rearwardly curved furrow opener, of a base plate mounted on the frame thereof, a rake arranged in advance of the opener of the planter and sloping rearwardly below the curve of said furrow-opener and having ground engaging teeth, a link connecting the said base plate and rake, a spring connected to the rake above the link, and means carried by the base plate for adjusting the tension of the spring.

3. An attachment of the class described comprising a rake, a base plate to which the rake is connected, a pivotal connection between said rake and said plate and an adjustable tensioning means between the rake and the base plate yieldingly maintaining the free end of the rake in engagement with the ground.

4. The combination with a planter having a rearwardly curved furrow opener, of a ground engaging element arranged in advance of the opener, and sloping rearwardly below the curve of said furrow opener for smoothing a path for the opener to follow.

5. An attachment of the class described comprising a base plate, a rake, a link pivotally connected at one end to the rake, intermediate of its ends, the other end of said link being pivotally connected to said base plate, a bracket carried by the base plate, an eye bolt adjustably mounted in the bracket, and a spring connecting at one end to the eye bolt and at its opposite end to the rake above the point at which said link is connected to the rake.

6. An attachment of the class described comprising a base plate, a rake, a link connecting the said base plate and rake, a spring connected to the rake above the link, and means carried by the base plate for adjusting the tension of the spring.

FRED IRENUS CLASSON.